United States Patent
Hamada et al.

(10) Patent No.: US 6,448,357 B1
(45) Date of Patent: Sep. 10, 2002

(54) POLYOLEFIN RESIN COMPOSITION

(75) Inventors: Naoshi Hamada; Sadamu Hirakawa; Akihiko Yamamoto, all of Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 76 days.

(21) Appl. No.: 09/616,886

(22) Filed: Jul. 14, 2000

(30) Foreign Application Priority Data

Jul. 14, 1999 (JP) ............................................. 11-200624
Jun. 19, 2000 (JP) ........................................ 2000-182803

(51) Int. Cl.$^7$ ................................................ C08F 10/14
(52) U.S. Cl. ................. 526/348.2; 526/352; 526/348.5; 526/348.6; 524/115; 524/147; 524/151
(58) Field of Search ........................... 526/348.2, 348.5, 526/348.6, 352; 524/115, 147, 151

(56) References Cited

U.S. PATENT DOCUMENTS

H1600 H * 10/1996 Imfeld et al. ................ 524/415
5,877,242 A * 3/1999 Niessner et al. ............. 524/111

FOREIGN PATENT DOCUMENTS

| EP | 0781789 A2 | 7/1997 |
| JP | 2276807 | 11/1990 |
| JP | 9183816 | 7/1997 |

* cited by examiner

Primary Examiner—David W. Wu
Assistant Examiner—William K Cheung
(74) Attorney, Agent, or Firm—Birch, Stewart, Kolasch & Birch, LLP

(57) ABSTRACT

A polyolefin resin composition comprising (A) an ethylene-based polyolefin having a density of 0.865 to 0.980 g/cm$^3$ and MFR of 0.01 to 50 g/10 min, (B) a phosphorous compound, and (C) at least one heat stabilizer selected from the group consisting of a phenol-based heat stabilizer and a tocopherol-based heat stabilizer. The polyolefin resin composition has excellent heat resistance, moisture resistance and discoloration resistance, and also when used as a packaging material, does not impair the taste of contents to be packaged, such as flavor or odor, and therefore does not impair the taste of the contents.

15 Claims, No Drawings

POLYOLEFIN RESIN COMPOSITION

BACKGROUND OF THE INVENTION

1. Field of the Invention

The present invention relates to a polyolefin resin composition. More particularly, the present invention relates to a polyolefin resin composition which has excellent heat resistance, moisture resistance and discoloration resistance, and also when used as a packaging material, does not impair the taste of contents to be packaged, such as flavor or odor, and therefore does not impair the taste of the contents.

2. Description of the Related Art

Polyolefins or resin compositions mainly comprising polyolefin have excellent properties of transparency, strength, chemical resistance, moldability and the like, and hence are used in various applications as various molded products. Further, in recent years, in view of the facts that polyolefins do not contain halogen atoms such as chlorine and therefore do not generate chlorine harmful substances such as dioxin during incineration, the polyolefins are strongly noted as a material having small environmental load.

However, when polyolefins were heated at high temperature in mold processing, there were the cases that the polyolefins cause disadvantages such as deterioration of mechanical strength due to deterioration by crosslinking or drop of MFR, poor appearance of a molded product due to formation of gelled product, deterioration of printability, and the like. Further, there was the case that the resin deteriorated under a wet atmosphere containing an acid, an alkali or the like and therefore the resin did not have excellent moisture resistance.

Further, polyolefins may discolor due to the influence of pollution substances in air, such as $NO_x$ or $SO_2$.

Furthermore, when foods, drinks or the like are packed in a packaging material comprising a sheet or film of polyolefins, components such as additives elute during keeping or storage over a long period of time, such an elution adds offensive smell, taste or odor to the contents, and as a result, taste, odor, flavor or the like of the contents themselves may be impaired.

SUMMARY OF THE INVENTION

Accordingly, an object of the present invention is to provide a polyolefin resin composition which has excellent heat resistance, moisture resistance and discoloration resistance, and also when used as a packaging material, does not impair the taste of contents to be packaged, such as flavor or odor, and therefore does not impair the taste of the contents.

To achieve the above object, the present invention provides a polyolefin resin composition comprising (A) an ethylene-based polyolefin having a density of 0.865 to 0.980 g/cm³ and MFR of 0.01 to 50 g/10 min, (B) a phosphorus compound, and (C) at least one heat stabilizer selected from the group consisting of a phenol-based heat stabilizer and a tocopherol-based heat stabilizer.

Preferably, the phosphorus compound (B) is a compound represented by the following formula (b-1):

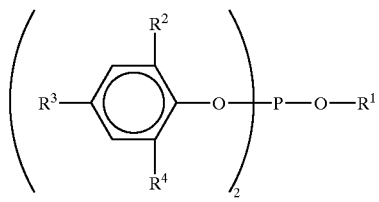

wherein $R^1$ represents a branched or linear alkyl group having 1 to 4 carbon atoms, and $R^2$, $R^3$ and $R^4$ which may be the same or different each represent hydrogen atom or a branched or linear alkyl group having 1 to 4 carbon atoms.

DETAILED DESCRIPTION OF THE PREFERRED EMBODIMENT

The polyolefin resin composition of the present invention (hereinafter referred to as a "composition of the present invention" for brevity) is explained in detail below.

The composition of the present invention comprises (A) an ethylene-based polyolefin and (B) a phosphorus compound as essential components, and further comprises (c) at least one heat stabilizer selected from the group consisting of a phenol-based heat stabilizer and a tocopherol-based heat stabilizer.

The ethylene-based polyolefin (A) which is the essential component in the composition of the present invention is a homopolymer of ethylene or a copolymer comprising ethylene and other monomer. The copolymer may be a random copolymer or a block copolymer. Examples of the other monomer include α-olefins having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene or 1-eicocene. Examples of the copolymer of ethylene and other monomer include copolymers of ethylene and α-olefins such as 4-methyl-1-pentene or 1-hexene.

The composition of the present invention may contain, as the ethylene-based polyolefin (A), only one kind selected from homopolymers of ethylene and copolymers of ethylene and other monomers, or a combination of two kinds or more. In particular, the preferred ethylene-based polyolefin is a copolymer of ethylene and at least one kind selected from α-olefins having 4 to 8 carbon atoms.

The ethylene-based polyolefin (A) has a density of 0.865 to 0.980 g/cm³, preferably 0.885 to 0.965 g/cm³ and more preferably 0.895 to 0.960 g/cm³. In the present invention, the density is a value obtained by heat-treating a strand which is obtained in measuring a melt flow rate (MFR) under a load of 2.16 kg at 190° C., at 120° C. for 1 hour, gradually cooling the heat-treated strand to room temperature over 1 hour, and measuring its density with a density gradient tube.

Melt flow rate (MFR) of the ethylene-based polyolefin is 0.01 to 50 g/10 min, preferably 0.05 to 40 g/10 min and more preferably 0.1 to 35 g/10 min. The MFR used in the present invention is a value measured under the conditions of 190° C. and 2.16 kg load according to ASTM D1238.

The ethylene-based polyolefin is obtained by polymerizing ethylene alone or ethylene and other monomer such as α-olefin by, for example, a polymerization using a Ziegler catalyst or a polymerization using a metallocene catalyst.

The metallocene catalyst is prepared by contacting (1) a transition metal compound such as bis(n-propylcyclopentadienyl)zirconium dichloride, (2) a benzene-soluble aluminooxane or a benzene-insoluble organoaluminumoxy compound (as disclosed in, for example, Japanese Patent Application Laid-Open No. Hei 2-276807), (3) fine particulate carrier having a particle diameter of 10 to 300 μm comprising $SiO_2$, $Al_2O_3$ or the like, and if necessary, (4) an organoaluminum compound such as $ET_2AlOAlET_2$.

Examples of the ethylene-based polyolefin obtained by polymerization using the metallocene catalyst include ethylene-α-olefin copolymers as disclosed in Japanese Patent Application Laid-Open No. Hei 9-183816.

The phosphorus compound (B) which is the essential component in the composition of the present invention is trivalent phosphorus compound(phosphite derivative). The preferred phosphorus compound (B) is a phosphorus compound represented by the above formula (b-1) . In the formula (b-1), $R^1$ represents a branched or linear alkyl group having 1 to 4 carbon atoms. Examples of the alkyl group for $R^1$ include methyl group, ethyl group, butyl group and t-butyl group. $R^2$, $R^3$ and $R^4$ which may be the same or different each represent hydrogen or a branched or linear alkyl group having 1 to 4 carbon atoms. Examples of the alkyl group for $R^2$, $R^3$ and $R^4$ include methyl group, ethyl group, butyl group and t-butyl group.

Examples of the phosphorus compound (B) represented by the formula (b-1) include bis(2,4-t-butyl-6-methyl) methylphosphite, bis(2,4-t-butyl-6-methyl)ethylphosphite, bis(2,4-t-butyl-6-methyl)t-butylphosphite and bis(2,4-t-butyl-6-methyl) butylphosphite. Of those, bis(2,4-t-butyl-6-methyl)ethylphosphite is preferable from the point that such is chemically stable.

The phosphorus compound also includes commercially available product: Irgafos 38, trade name, a product of Ciba Specialty Chemical.

In the composition of the present invention, the blending proportion of the phosphorus compound (B) is preferably 0.005 to 0.3 part by weight and more preferably 0.01 to 0.2 part by weight, per 100 parts by weight of the ethylene-based polyolefin. If the proportion of the phosphorus compound (B) is too large, the phosphorus compound separates on a surface of a molded product, resulting in poor appearance. On the other hand, if it is too small, the effect of preventing heat degradation of a molded product is impaired.

Preferably, the composition of the present invention may further contains a phosphorus compound represented by the following formula (b-2) together with the phosphorus compound (B), and this inclusion is preferable in the point of heat resistance.

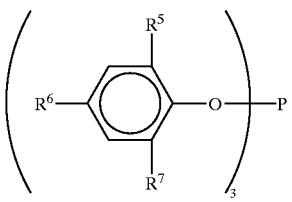

Wherein $R^5$, $R^6$ and $R^7$ which may be the same or different each represent hydrogen or a branched or linear alkyl group having 1 to 4 carbon atoms. Examples of the branched or linear alkyl group for $R^5$, $R^6$ and $R^7$ include methyl group, ethyl group, butyl group, t-butyl group and the like.

Examples of the phosphorus compound (B-2) represented by the formula (b-2) include triphenylphosphite, tris(2,4-di-tert-butylphenyl)phosphite or the like. Of those, tris(2,4-di-tert-butylphenyl)phosphite are preferable in the point that such are chemically stable.

In the case where the phosphorus compound (B-2) and the phosphorus compound (B) are blended as the composition of the present invention, the blending proportion is 0.01 to 0.10 part by weight, per 100 parts by weight of the ethylene-based polyolefin.

The composition of the present invention also contain (C) at least one heat stabilizer selected from the group consisting of a phenol-based heat stabilizer and a tocopherol-based heat stabilizer, as the essential component. The phenol-based heat stabilizer or tocopherol-based heat stabilizer as the heat stabilizer (C) may be blended alone or as a combination of two kinds or more.

The phenol-based heat stabilizer is a compound having one or more than two t-butyl-4-hydroxyphenyl group or t-butyl-4-hydroxybenzyl group in the molecule. Examples of the phenol-based heat stabilizer include 1,3,5-tris(3',5'-di-t-butyl-4'-hydroxybenzyl)-1,3,5-triazine-2,4,6-(1H, 3H, 5H)trione, stearyl-β-(3,5-di-t-butyl-4-hydroxyphenyl) propionate, tetrakis-[methylene-3-(3',5'-di-t-butyl-4'-hydroxyphenyl)propionate]methane, bis[4'-hydroxy-3'-t-butylphenyl)butyric acid]thioglycol ester, 2,2'-thiobis(4-methyl-6-t-butylphenol), 1,3,5-trimethyl-2,4,6-tris(3,5-di-t-butyl-4-hydroxybenzyl)benzene and the like.

Examples of the phenol-based heat stabilizer include commercially available products: Irganox 3114, 1076, 1010, 1035, 1081 and 1330, trade name, products of Ciba Specialty Chemical, and Goodrite 3114, trade name, a product of BF Goodrich.

Examples of the tocopherol-based heat stabilizer include 3,4-dihydro-2,5,7,8-tetramethyl-2-(4,8,12-trimethyltridecyl)-2H-1-benzopyrane-6-ol(α-tocopherol) and a mixture of the α-tocopherol, polyethylene and a color tone improver such as glycerin or a built-in lubricant such as calcium stearate.

Specific examples of the tocopherol-based heat stabilizer include commercially available products: Irganox E201, 217 and 218, trade name, products of Ciba Spacialty Chemical, and vitamin E sold by Eizai Co.

The blending proportion of at least one heat stabilizer (C) selected from the phenol-based heat stabilizer and the tocopherol heat stabilizer in the composition of the present invention is preferably 0.005 to 0.3 part by weight and more preferably 0.01 to 0.3 part by weight, per 100 parts by weight of the ethylene-based polyolefin. If the blending proportion of the heat stabilizer (C) is too large, the heat stabilizer bleeds on the surface of a molded product, resulting in poor appearance of the molded product. On the other hand, if the proportion is too small, there is the possibility of insufficient heat resistance and decrease in the effect of preventing coloration.

The composition of the present invention may further contain various additives that are added to composition of this type, in an amount such that the object of the present invention is not impaired. Examples of the additives that may be added include absorbers for hydrochloric acid, weathering agents, slip preventives, anti-blocking agents, antistatic agents, anti-fogging agents, lubricants, pigments, dyes, crystal nucleating agents, plasticizers and antioxidants.

The composition of the present invention can be formed into the desired molded product by various molding methods such as inflation film molding method, T-die extrusion molding method, cast film molding method, injection molding method or blow molding method.

The composition of the present invention has a peak time of melt kneading torque in molding and processing of preferably 10 min. or longer and more preferably 12 min. or longer. If the peak time of melt kneading torque is short, crosslinked gel is formed, resulting in poor appearance and strength of a molded. In the present invention, the peak time of melt kneading torque in molding and processing means time tp (min) until torque which increases with the passage of time reaches the peak value when 45 g of pellets of a resin composition is charged in a plastograph (Labo plastomill Model 75C, manufactured by Toyo Seiki K.K.), and melt kneaded in air under the condition of screw revolution number 100 rpm and 200° C., and the value of kneading torque is continuously measured. The larger tp, the better the heat resistance in molding and processing. The composition of the present invention is preferable to be a little elution and less susceptible to be discolored from the standpoint that disadvantages is not caused such that when the resin composition is used as a material of packaging sheet or film in which foods or drinks such as soup, juice, mineral water are placed, components such as additives elute during keeping and storage over a long period of time, offensive odor, taste, smell and the like are added to the contents, and as a result, taste, smell, flavor and the like of the contents themselves are impaired, and also change in appearance due to discoloratin or fading. This can be evaluated by that acidity of water which changes in accordance with components eluted in water by hydrolysis, oxidation, deterioration or the like is employed as a measure. For example, preferable polyolefin resin composition is that when a film having a thickness of 40 $\mu$m prepared from the polyolefin resin composition is refluxed in 100 ml of water at 100° C. for 2 hours, pH of the water is 6 to 8. Further, preferable resin composition is that indicate good result on the $NO_x$ discoloration test hereinafter.

EXAMPLES

The present invention is described in more detail by reference to the following Examples and Comparative Examples, but the invention is not limited to those.

In the following Examples and Comparative Examples, measurement of $\Delta$MER, melt kneading test, $NO_x$ discoloration test and taste test were conducted in the following manners.

(1) $\Delta$MFR Measurement

A resin composition was subjected to granulation by repeatedly melt extruding five times at 260° C. using a 65 mm diameter extruder (manufactured by Kasamatsu). MFR (M-1) of the initial resin composition before extrusion and MFR (M-2) of the resin composition after extrusion granulation five times were measured, and the difference therebetween: (M-1)-(M-2)=$\Delta$MFR was obtained as a measure of heat resistance in molding and processing.

(2) Melt Kneading Test 45 g of pellets of a resin composition is charged in a plastograph (Labo plastomill Model 75C, manufactured by Toyo Seiki K.K.), and melt kneaded in air under the condition of screw revolution number 100 rpm and 200° C., and the value of kneading torque is continuously measured. At this time, the torque elevated with the passage of time. Time tp (min) until the torque reaches the peak value was measured, and it was used as a measure of heat resistance in molding and processing. The larger tp, the better the heat resistance in molding and processing.

(3) $NO_x$ Discoloration Test

A resin composition was molded into a press sheet having a thickness of 2 mm using a compression molding machine (manufactured by Shinto Kinzoku Kogyosho).

This press sheet was exposed to an atmosphere containing 6 ppm of $NO_x$ under a humidity of 87.5%±2.5% at a temperature of 40° C. for 48 hours. The degree of discoloration was examined. The discoloration was evaluated with five grades of good: 5,4,3,2,1: bad.

(4) Taste Test

Pellets of a resin composition were dipped in natural water at 90° C., gradually cooled and then allowed to stand for 10 days. Taste of the natural water was judged, and evaluated with five grades of good: 5,4,3,2,1: bad.

5 g of a film having a thickness of 40 $\mu$m made from a resin composition was collected, and the film was placed in a glass-made flask having an inner volume of 200 ml together with 100 ml of drinking water ("Nippon No Tennensui", trade name, a product of Suntory Co.). The mixture was refluxed at 100° C. for 2 hours, and pH of the water was measured as a measure of taste. The material measured in pH 6 to 8 is little change in taste and evaluated in good.

Example 1

100 Parts by weight of a polyethylene (density: 0.918 g/cm$^3$ and MFR: 4.4 g/10 min) prepared using a metallocene catalyst, 0.05 part by weight of 1,3,5-tris(3',5'-di-t-butyl-4'-hydroxybenzyl)-1,3,5-triazine-2,4,6-(1H,3H,5H)trione (Irganox 3114, trade name, a product of Ciba Specialty Chemical Co.) as a phenol-based heat stabilizer and 0.1 part by weight of bis(2,4-t-butyl-6-methyl)ethylphosphite (Irgafos 38, trade name, a product of Ciba Specialty Chemical Co.) as a phosphorus compound were supplied in an extruder, and melt kneaded at 200° C. to prepare a resin composition.

The resin composition thus obtained was subjected to AMFR measurement, melt kneading test, $NO_x$ discoloration test and taste test. The results obtained are shown in Table 1 below.

Examples 2 to 9

Each of polyethylenes having a density and MFR shown in Table 1 obtained using a metallocene catalyst was used. Using the polyethylene, a phenol-based heat stabilizer, a phosphorus compound and a tocopherol-based heat stabilizer in the blending proportions shown in Table 1, a resin composition was prepared in the same manner as in Example 1. The resin composition thus obtained was subjected to ΔMFR measurement, melt kneading test, $NO_x$ discoloration test and taste test. The results obtained are shown in Table 1 below.

Comparative Example 1

A resin composition was prepared in the same manner as in Example 1 except for using 0.1 part by weight of tris(2,4-di-t-butylphenyl)phosphite (Irgafos 168, trade name, a product of Ciba Specialty Chemical Co.) as a phosphorus compound in place of bis(2,4-t-butyl-6-methyl) ethylphosphite, a polyethylene having a density and MFR shown in Table 1 prepared using a Ziegler catalyst and each component in the blending proportion as shown in Table 1.

The resin composition thus obtained was subjected to ΔMFR measurement, melt kneading test, $NO_x$ discoloration test and taste test. The results obtained are shown in Table 1 below.

Comparative Example 2

A resin composition was prepared in the same manner as in Example 1 except for using 0.05 part by weight of tris(2,4-di-t-butylphenyl)phosphite (Irgafos 168, trade name, a product of Ciba Specialty Chemical Co.) as a phosphorus compound in place of bis(2,4-t-butyl-6-methyl) ethylphosphite, a polyethylene having a density and MFR shown in Table 1 prepared using a Ziegler catalyst and each component in the blending proportion as shown in Table 1.

The resin composition thus obtained was subjected to ΔMFR measurement, melt kneading test, $NO_x$ discoloration test and taste test. The results obtained are shown in Table 1 below.

TABLE 1-1

|  | Example | | | | | Comparative Example |
|---|---|---|---|---|---|---|
|  | 1 | 2 | 3 | 4 | 5 | 1 |
| Polyethylene | | | | | | |
| Density (g/cm³) | 0.918 | 0.925 | 0.903 | 0.902 | 0.940 | 0.921 |
| MFR (g/10 min.) | 4.4 | 1.9 | 3.9 | 1.5 | 2.1 | 2.1 |
| Phosphorus compound (Part by weight)* | A-1 (0.1) | A-1 (0.1) | A-1 (0.1) | A-1/A-2 (0.05/0.05) | A-1 (0.1) | A-2 (0.1) |
| Phenol-based heat stabilizer (Part by weight)* | B-1 (0.05) | B-2 (0.1) | B-3 (0.1) | B-1 (0.05) | B-1 (0.05) | B-2 (0.15) |
| ΔMFR | 0.2 | 0.1 | 0.2 | 0.1 | 0.1 | 0.4 |
| tp (min.) | 15.2 | 14.3 | 15.6 | 18.5 | 15.5 | 7.3 |
| $NO_x$ Discoloration test | 5 | 5 | 5 | 4 | 5 | 1 |
| Taste | 5 | 5 | 5 | 4 | 5 | 3 |
| PH | 6.9 | 6.9 | 6.9 | 6.8 | 6.8 | 4.8 |

TABLE 1-2

|  | Example | | | | Comparative Example |
|---|---|---|---|---|---|
|  | 6 | 7 | 8 | 9 | 2 |
| Polyethylene | | | | | |
| Density (g/cm³) | 0.960 | 0.955 | 0.953 | 0.960 | 0.953 |
| MFR (g/10 min.) | 0.35 | 0.06 | 0.7 | 0.35 | 0.7 |
| Phosphorus compound (part by weight)* | A-1 (0.05) | A-1 (0.02) | A-1 (0.05) | A-1/A-2 (0.03/0.02) | A-2 (0.05) |
| Heat stabilizer | | | | | |
| Phenol-based (Part by weight)* | B-2 (0.1) | B-2 (0.08) |  | B-2 (0.08) |  |
| Tocopherol-based (Part by weight)* |  |  | C-1 (0.1) |  | C-1 (0.1) |
| ΔMFR | 0.03 | 0 | 0.01 | 0 | 0.1 |
| tp (min.) | 12.3 | 12.0 | 14.2 | 15.8 | 5.2 |
| $NO_x$ Discoloration test | 5 | 4 | 4 | 4 | 3 |
| Taste | 5 | 5 | 4 | 5 | 1 |
| PH | 6.9 | 6.8 | 6.5 | 6.8 | 3.2 |

(Notes)
A-1: Bis(2,4-di-t-butyl-6-methyl)ethylphosphite (Irgafos 38, trade name, a product of Ciba Specialty Chemical Co.)
A-2: Tris(2,4-di-t-butylphenyl)phosphite (Irgafos 168, trade name, a product of Ciba Specialty Chemical Co.)
B-1: 1,3,5-Tris(3',5'-di-t-butyl-4'-hydroxybenzyl)-1,3,5-triazine-2,4,6-(1H,3H,5H)trione (Irganox 3114, trade name, a product of Ciba Specialty Chemical Co.)
B-2: Stearyl-β-(3,5-di-t-butyl-4-hydroxyphenyl)propionate (Irganox 1076, trade name, a product of Ciba Specialty Chemical Co.)
B-3: Tetrakis-[methylene-3-(3',5'-di-t-butyl-4'-hydroxyphenyl)propionate] methane (Irganox 1010, trade name, a product of Ciba Specialty Chemical Co.)
C-1: α-Tocopherol (Irganox E201, trade name, a product of Ciba Specialty Chemical Co.)
(Part by weight)*: Part by weight of additives per 100 parts by weight of polyethylene The composition of the present invention has excellent heat resistance, moisture resistance and discoloration resistance, and also when used as a packaging material, does not impair the taste of contents to be packaged, such as flavor or odor, and therefore does not impair the taste of the contents. As a result, the composition of the present invention is suitable for use as a material of food packaging films or sheets, protective films, or molded products by blow molding or injection molding, such as vessels (e.g., bottles).

What is claimed is:

1. A polyolefin resin composition comprising
   (A) an ethylene-based polyolefin having a density of 0.865 to 0.980 g/cm³ and MFR of 0.01 to 50 g/10 min;
   (B) a phospohorus compound represented by the following formula (b-1):

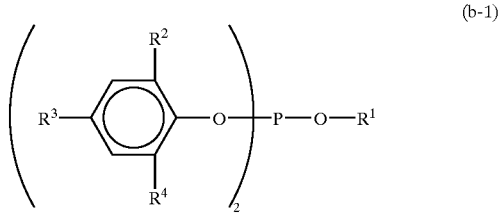

wherein $R^1$ represents a branched or linear alkyl group having 1 to 4 carbon atoms, and $R^2$, $R^3$ and $R^4$ are the same or different from each other and each represents a hydrogen atom or a branched or linear alkyl group having 1 to 4 carbon atoms; and
   (C) at least one heat stabilizer selected from the group consisting of a phenol-based heat stabilizer and a tocopherol-based heat stabilizer.

2. The polyolefin resin composition as claimed in claim 1, wherein said ethylene-based polyolefin is a polyethylene.

3. The polyolefin resin composition as claimed in claim 1, wherein $R^1$ in the formula (b-1) representing said phosphorous compound (B) is ethyl group.

4. The polyolefin resin composition as claimed in claim 3, wherein said phosporus compound (B) further comprises a phosphorus compound represented by the formula (b-2),

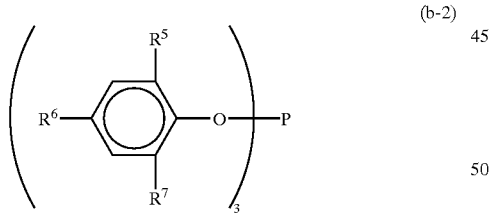

wherein $R^5$, $R^6$ and $R^7$ are either the same or different from each other and each represents a hydrogen atom or a branched or linear alkyl group having 1 to 4 carbon atoms.

5. The polyolefin resin composition as claimed in claim 1, wherein said heat stabilizer (C) is a compound having one or more than two t-butyl-4-hydroxyphenyl group or t-butyl-4-hydroxybenzyl group in the molecule.

6. The polyolefin resin composition as claimed in claim 1, wherein a peak time of melt kneading torque in molding and processing is 10 minutes or more.

7. The polyolefin resin composition as claimed in claim 1, wherein when a film made from the polyolefin resin composition is refluxed in water at 100° C., the water has pH of 6 to 8.

8. The polyolefin resin composition of claim 1, wherein said ethylene-based polyolefin has a density of 0.895 to 0.960 g/cm³.

9. The polyolefin resin composition of claim 1, wherein said ethylene-based polyolefin has an MFR of 0.1 to 35 g/10 min.

10. The polyolefin resin composition of claim 1, wherein said phosphorus compound (B) is selected from the group consisting of bis(2,4-t-butyl-6-methyl)methylphosphite, bis(2,4-t-butyl-6-methyl)ethylphosphite, bis(2,4-t-butyl-6-methyl)t-butylphosphite, and bis(2,4-t-butyl-6-methyl)butylphosphite.

11. The polyolefin resin composition of claim 1, wherein the blending proportion of said phosphorus compound (B) is 0.005 to 0.3 parts by weight per 100 parts by weight of said ethylene-based polyolefin.

12. The polyolefin resin composition of claim 1, said composition further comprising an additive.

13. The polyolefin resin composition of claim 4, wherein said phosphorus compound (B) of formula (b-2) is triphenylphosphite or tris(2,4-di-tert-butylphenyl)phosphite.

14. A polyolefin resin composition comprising
   (A) an ethylene-based polyolefin having a density of 0.885 to 0.965 g/cm³ and MFR of 0.05 to 40 g/10 min;
   (B) a phospohorus compound represented by the following formula (b-1):

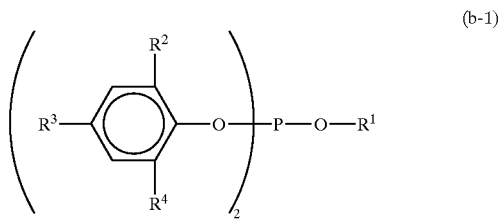

wherein $R^1$ represents a branched or linear alkyl group having 1 to 4 carbon atoms, and $R^2$, $R^3$ and $R^4$ are the same or different from each other and each represents a hydrogen atom or a branched or linear alkyl group having 1 to 4 carbon atoms; and
   (C) at least one heat stabilizer selected from the group consisting of a phenol-based heat stabilizer and a tocopherol-based heat stabilizer;
   wherein said phosporus compound (B) further comprises a phosphorus compound represented by the formula (b-2),

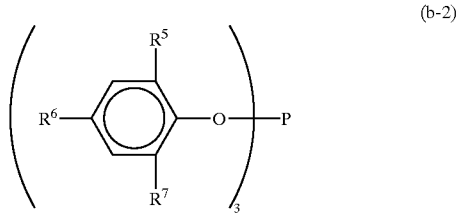

wherein $R^5$, $R^6$ and $R^7$ are either the same or different from each other and each represents a hydrogen atom or a branched or linear alkyl group having 1 to 4 carbon atoms.

15. The polyolefin resin composition of claim 14, wherein said phosphorus compound (B) is selected from the group consisting of bis(2,4-t-butyl-6-methyl)methylphosphite, bis(2,4-t-butyl-6-methyl)ethylphosphite, bis(2,4-t-butyl-6-methyl)t-butylphosphite, and bis(2,4-t-butyl-6-methyl)butylphosphite.

* * * * *